United States Patent
Chen et al.

(10) Patent No.: US 12,454,986 B2
(45) Date of Patent: Oct. 28, 2025

(54) ENERGY-SAVING ELECTROMAGNETIC BRAKE AND OPERATION METHOD THEREOF

(71) Applicant: Delta Electronics, Inc., Taoyuan (TW)

(72) Inventors: Chieh-Cheng Chen, Taoyuan (TW);
Ming-Chih Tsai, Taoyuan (TW);
Chia-Chi Lin, Taoyuan (TW); Yu-Wei Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 516 days.

(21) Appl. No.: 17/960,434

(22) Filed: Oct. 5, 2022

(65) Prior Publication Data
US 2023/0332654 A1    Oct. 19, 2023

(30) Foreign Application Priority Data
Apr. 19, 2022    (CN) .......................... 202210411580.8

(51) Int. Cl.
| | |
|---|---|
| *F16D 63/00* | (2006.01) |
| *F16D 121/20* | (2012.01) |
| *H02K 3/04* | (2006.01) |
| *H02K 11/30* | (2016.01) |

(52) U.S. Cl.
CPC ............. *F16D 63/002* (2013.01); *H02K 3/04* (2013.01); *H02K 11/30* (2016.01); *F16D 2121/20* (2013.01)

(58) Field of Classification Search
CPC .... F16D 63/002; F16D 65/14; F16D 2121/20; H02K 3/04; H02K 11/30; H02K 49/043
See application file for complete search history.

(56) References Cited

FOREIGN PATENT DOCUMENTS

| | | | |
|---|---|---|---|
| CN | 204961645 | * | 1/2016 |
| CN | 112178076 | * | 1/2021 |
| JP | S56160160 | U | 11/1981 |
| JP | 6366552 | * | 8/2018 |

* cited by examiner

*Primary Examiner* — Pamela Rodriguez
(74) *Attorney, Agent, or Firm* — MUNCY, GEISSLER, OLDS & LOWE, P.C.

(57) ABSTRACT

An energy-saving electromagnetic brake includes a base, a first winding coil, a second winding coil, and a control circuit component. The first winding coil is disposed inside the base, wherein the first winding coil has a first resistance value. The second winding coil is disposed inside the base and is disposed around the first winding coil, wherein the second winding coil has a second resistance value, and the second resistance value is greater than the first resistance value. The control circuit component is disposed inside the base and is electrically connected to the first winding coil and the second winding coil. In a first period, the control circuit component drives the first winding coil. In a second period, the control circuit component simultaneously drives the first winding coil and the second winding coil, and the first winding coil and the second winding coil are connected in series.

14 Claims, 8 Drawing Sheets

ENERGY-SAVING ELECTROMAGNETIC BRAKE AND OPERATION METHOD THEREOF

CROSS REFERENCE TO RELATED APPLICATIONS

This application claims priority of China Patent Application No. 202210411580.8, filed on Apr. 19, 2022, the entirety of which is incorporated by reference herein.

BACKGROUND

Field of the Invention

The present invention relates to a brake, and in particular it relates to an energy-saving electromagnetic brake and the operation method thereof.

Description of the Related Art

Generally speaking, electromagnetic brakes are widely used in robotic arms and various types of motors. They are an indispensable component of Industry 4.0. Currently, existing electromagnetic brakes use a winding coil combined with stamping and turning parts. As robot arms become more and more miniature, the space into which components must be installed is increasingly compressed. As a result, the brakes have become thinner and smaller.

As the brake is reduced in size, the amount of braking force that can be generated decreases. Current practice to increase actuation force is to pull up the voltage at the beginning of the actuation, and then drop the voltage back to the original supply voltage after the brake actuation position reaches a fixed point. However, the buck-boost voltage needs to be controlled by an external power supply device. This indirectly increases the number of control devices that are required, and hence the cost. It also causes unnecessary energy consumption during the buck-boost process. Therefore, how to effectively reduce power consumption and reduce the volume of the energy-saving electromagnetic brake has become an important issue.

SUMMARY

An embodiment of the present invention provides an energy-saving electromagnetic brake and an operation method thereof, thereby effectively reducing the power consumption and the volume of the energy-saving electromagnetic brake.

An embodiment of the present invention provides an energy-saving electromagnetic brake, which includes a base, a first winding coil, a second winding coil and a control circuit component. The first winding coil is disposed inside the base, wherein the first winding coil has a first resistance value. The second winding coil is disposed inside the base and disposed around the first winding coil, wherein the second winding coil has a second resistance value, and the second resistance value is greater than the first resistance value. The control circuit component is disposed inside the base, wherein the control circuit component is electrically connected to the first winding coil and the second winding coil. In a first period, the control circuit component drives the first winding coil. In a second period, the control circuit component simultaneously drives the first winding coil and the second winding coil, and the first winding coil and the second winding coil are connected in series.

An embodiment of the present invention provides an operation method of an energy-saving electromagnetic brake, which includes the following steps. A base is provided. A first winding coil disposed inside the base is provided, wherein the first winding coil has a first resistance value. A second winding coil disposed inside the base and disposed around the first winding coil is provided, wherein the second winding coil has a second resistance value, and the second resistance value is greater than the first resistance value. The control circuit component disposed inside the base is provided, wherein the control circuit component is electrically connected to the first winding coil and the second winding coil. In a first period, the control circuit component is used to drive the first winding coil. In a second period, the control circuit component is used to simultaneously drive the first winding coil and the second winding coil, wherein the first winding coil and the second winding coil are connected in series.

According to the energy-saving electromagnetic brake and the operation method thereof disclosed by the present invention, the first winding coil is disposed inside the base, and the first winding coil has the first resistance value. The second winding coil is disposed inside the base and disposed around the first winding coil, the second winding coil has the second resistance value, and the second resistance value is greater than the first resistance value. The control circuit component is disposed inside the base, and the control circuit component is electrically connected to the first winding coil and the second winding coil. In the first period, the control circuit component drives the first winding coil. In the second period, the control circuit component simultaneously drives the first winding coil and the second winding coil, and the first winding coil and the second winding coil are connected in series. Therefore, the power consumption and the volume of the energy-saving electromagnetic brake may be effectively reduced.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, a person skilled in the art would selectively implement all or some technical features of any embodiment of the disclosure or selectively combine all or some technical features of the embodiments of the disclosure.

In each of the following embodiments, the same reference number represents an element or component that is the same or similar.

Figure 1A:
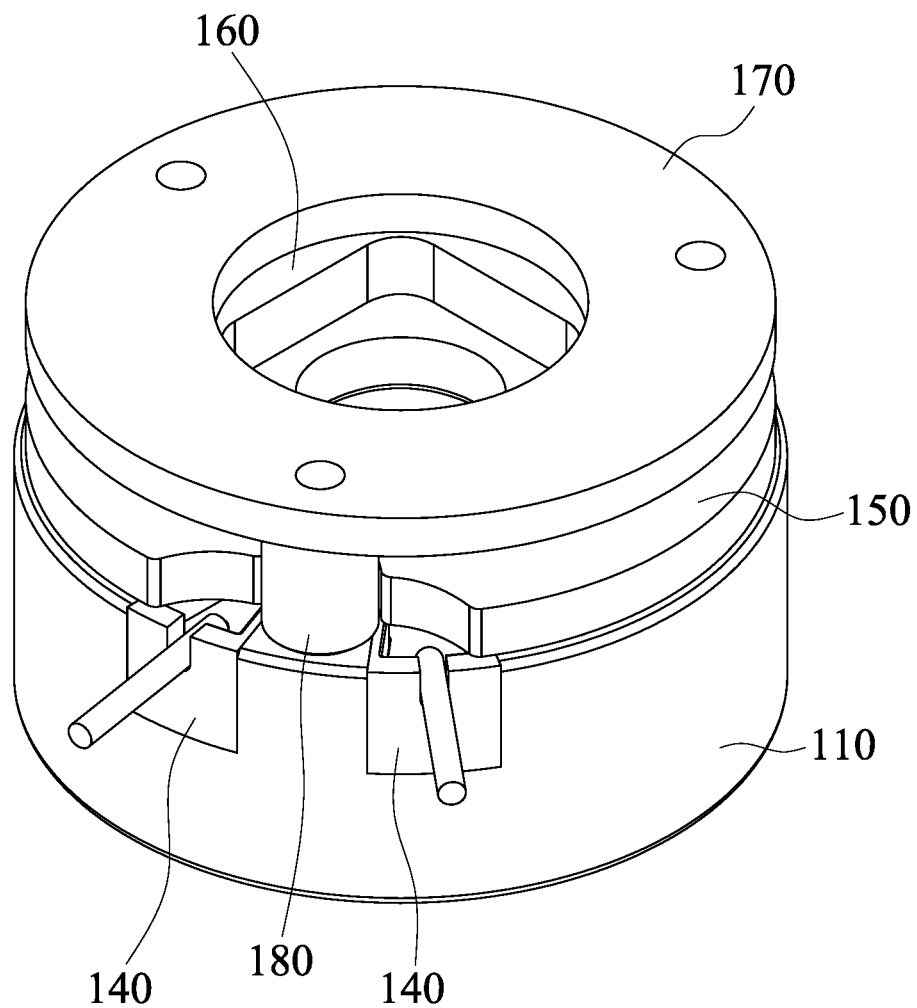
FIG. 1A is a perspective view of an energy-saving electromagnetic brake according an embodiment of the present invention.
Figure 1B:
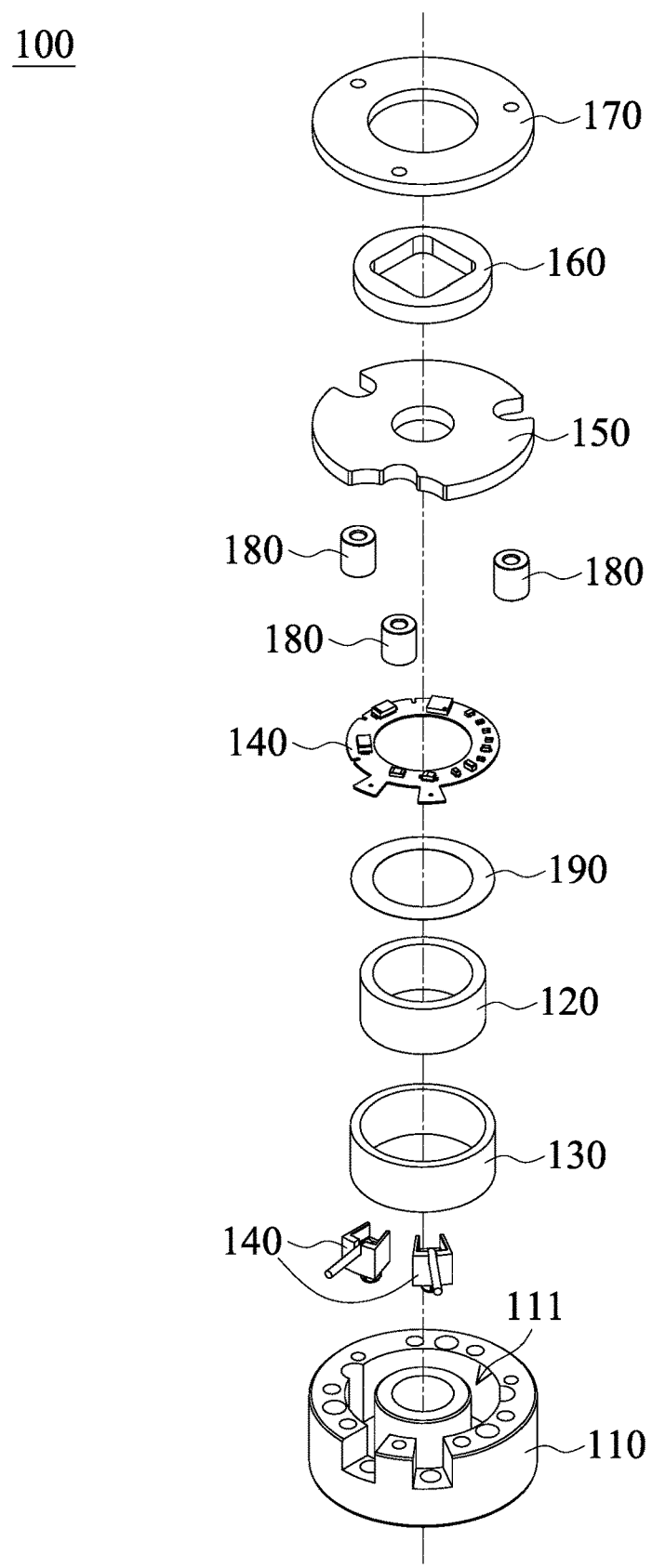
FIG. 1B is an exploded schematic diagram of an energy-saving electromagnetic brake according an embodiment of the present invention.

FIG. 1A is a perspective view of an energy-saving electromagnetic brake according an embodiment of the present invention. FIG. 1B is an exploded schematic diagram of an energy-saving electromagnetic brake according an embodiment of the present invention. Please refer to FIG. 1A and FIG. 1B. The energy-saving electromagnetic brake 100 includes a base 110, a first winding coil 120, a second winding coil 130 and a control circuit component 140.

In the embodiment, the material of the base 110 is, for example, metal, but the embodiment of the present invention is not limited thereto. The first winding coil 120 may be disposed inside the base 110, for example, disposed inside the accommodating space 111 of the base 110. In addition, the first winding coil 120 has a first resistance value.

The second winding coil 130 may be disposed inside the base 110, for example, disposed inside the accommodating space 111 of the base 110, and the second winding coil 130 may be disposed around the first winding coil 120. In addition, the second winding coil 130 has a second resistance value. In the embodiment, the second resistance value of the second winding coil 130 is, for example, greater than the first resistance value of the first winding coil 120. For example, the wire diameter of the second winding coil 130 is, for example, smaller than the wire diameter of the first winding coil 120.

The control circuit component 140 may be disposed inside the base 110, for example, disposed inside the accommodating space 111 of the base 110. The control circuit component 140 may be electrically connected to the first winding coil 120 and the second winding coil 130. In the embodiment, the first winding coil 120 and the second winding coil 130 are disposed, for example, between the base 110 and the control circuit component 140.

In the embodiment, in a first period, the control circuit component 140 may drive the first winding coil 120. At this time, the energy-saving electromagnetic brake 100 provides a large magnetic attraction force through the operation of the first winding coil 120 having the small resistance value as the activation of the energy-saving electromagnetic brake 100.

In a second period, the control circuit component 140 may simultaneously drive the first winding coil 120 and the second winding coil 130, and the first winding coil 120 and the second winding coil 130 are connected in series. At this time, the energy-saving electromagnetic brake 100 provides the sufficient magnetic attraction force through the operation of the first winding coil 120 and the second winding coil 130 having the large resistance value combined with the small resistance value to maintain the operation of the energy-saving electromagnetic brake 100. Therefore, the excessive energy retention force may be avoided, so as to effectively reduce the power consumption of the energy-saving electromagnetic brake 100. In addition, the first winding coil 120, the second winding coil 130 and the control circuit component 140 are disposed inside the base 110, so as to effectively the volume of the energy-saving electromagnetic brake 100.

In the embodiment, the first period is different from the second period. For example, there is a time difference between the first period and the second period. That is, after the control circuit component 140 drives the first winding coil 120 in the first period, the control circuit component 140 may wait for the above time difference, and simultaneously drive the first winding coil 120 and the second winding coil 130 in the second period.

In the embodiment, the energy-saving electromagnetic brake 100 further includes a lower cover backplane 150, a brake pad 160, an upper cover backplane 170 and at least one fixing element 180.

The lower cover backplane 150 may be disposed on the base 110. The brake pad 160 may be disposed on the lower cover backplane 150. The upper cover backplane 170 may be disposed on the brake pad 160. That is, the brake pad 160 is disposed between the lower cover backplane 150 and the upper cover backplane 170. The least one fixing element 180 is configured to fix the lower cover backplane 150 and the upper cover backplane 170 on the base 110. In the embodiment, the fixing element 180 may be a screw, a nut, etc., but the embodiment of the present invention is not limited thereto. In addition, in the embodiment, the number of the fixing element 180 is shown as three, but the embodiment of the present invention is not limited thereto. The user may adjust the number of the fixing element 180 according to the requirements thereof.

In addition, in the embodiment, the energy-saving electromagnetic brake 100 further includes an insulating sheet 190. The insulating sheet 190 may be disposed between the control circuit component 140 and the first winding coil 120 and the second winding coil 130, so as to avoid the circuit element of the control circuit component 140 from directly contacting the first winding coil 120 and the second winding coil 130 resulted in causing the phenomenon of error operation of circuit.

Figure 2:
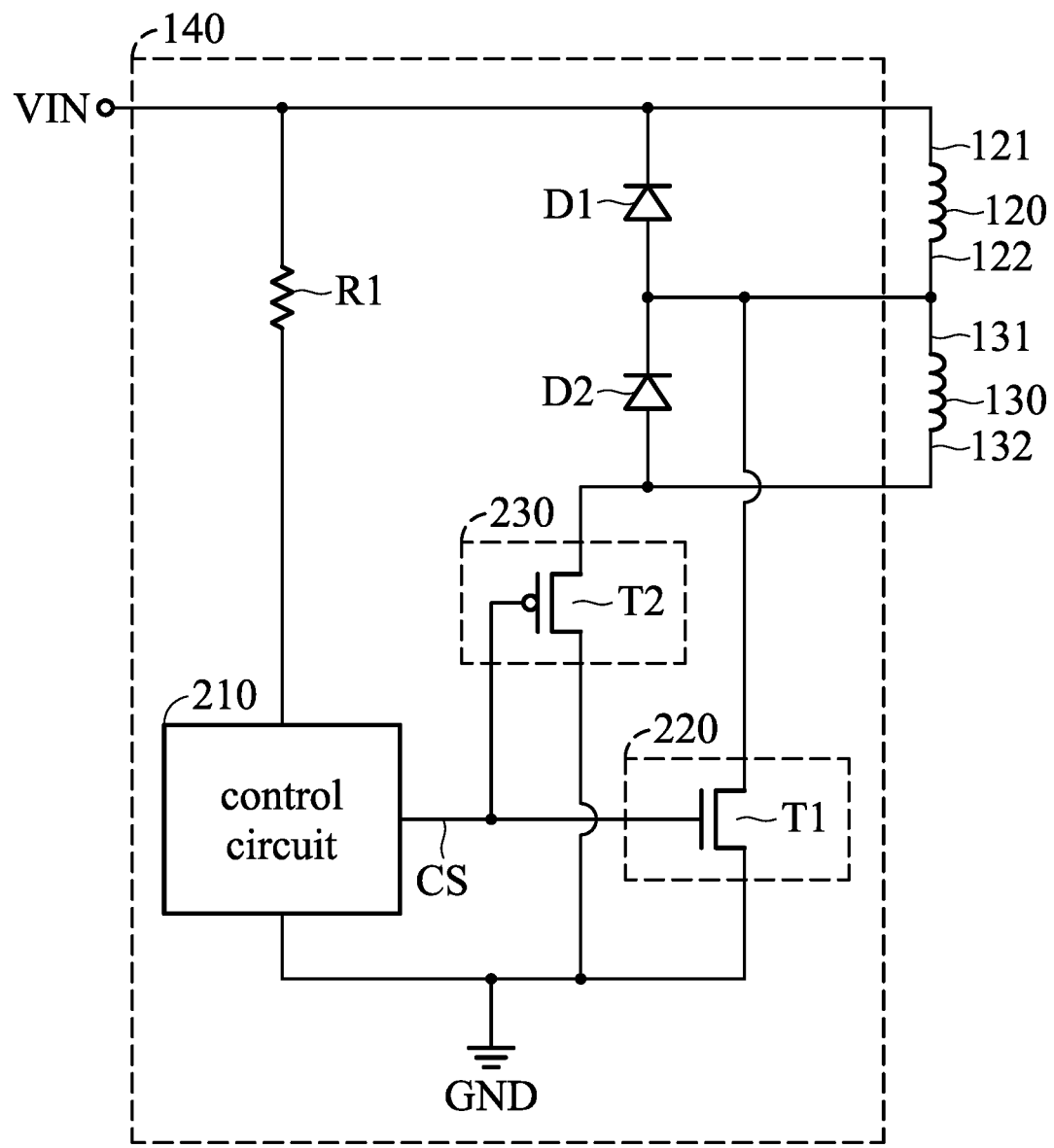
FIG. 2 is a schematic circuit diagram of a control circuit component according an embodiment of the present invention.

FIG. 2 is a schematic circuit diagram of a control circuit component according an embodiment of the present invention. Please refer to FIG. 2. The control circuit component 140 may include a resistor R1, a control circuit 210, a first switch unit 220 and a second switch unit 230.

The resistor R1 has a first terminal and a second terminal. The first terminal of the resistor R1 receives an input voltage VIN is electrically connected to a first terminal 121 of the first winding coil 120. The control circuit 210 is electrically connected to the second terminal of the resistor R1. In the embodiment, the control circuit 210 is, for example, a resistor-capacitor (RC) time delay circuit, but the embodiment of the present invention is not limited thereto.

The first switch unit 220 has a first terminal, a second terminal and a control terminal. The first terminal of the first switch unit 220 is electrically connected to a second terminal 122 of the first winding coil 120 and a first terminal 131 of the second winding coil 130. The second terminal of the first switch unit 220 is electrically connected to a ground terminal GND. The control terminal of the first switch unit 220 is electrically connected to the control circuit 210.

The second switch unit 230 has a first terminal, a second terminal and a control terminal. The first terminal of the second switch unit 230 is electrically connected to the ground terminal GND. The second terminal of the second switch unit 230 is electrically connected to a second terminal 132 of the second winding coil 130. The control terminal of the second switch unit 230 is connected to the control circuit 210.

In the embodiment, the operation of the first switch unit 220 is complementary to the operation of the second switch unit 230. For example, when the first switch unit 220 is turned on, the second switch unit 230 is not turned on. When the second switch unit 230 is turned on, the first switch unit 220 is not turned on.

In the embodiment, the first switch 220 may be an N-type transistor T1, such as a N-type metal oxide semiconductor field effect transistor (MOSFET). In the embodiment, the first terminal of the first switch unit 220 is, for example, a drain terminal of the N-type transistor T1, the second terminal of the first switch unit 220, is for example, a source terminal of the N-type transistor T1, and the control terminal of the first switch unit 220 is, for example, a gate terminal of the N-type transistor T1, but the embodiment of the present invention is not limited thereto. In other embodiments, the first switch unit 220 may also be, for example, a NPN-type bipolar junction transistor (BJT) or any suitable transistor.

In addition, the second switch unit 230 may be a P-type transistor T2, such as a P-type metal oxide semiconductor field effect transistor. In the embodiment, the first terminal of the second switch unit 230 is, for example, a drain terminal of the P-type transistor T2, the second terminal of the second switch unit 230 is, for example, a source terminal of the P-type transistor T2, and the control terminal of the second switch unit 230 is, for example, a gate terminal of the P-type transistor T2, but the embodiment of the present invention is not limited thereto. In other embodiments, the second switch unit 230 may also be, for example, a PNP-type bipolar junction transistor (BJT) or any suitable transistor.

In the embodiment, the control circuit component 140 further includes a first diode D1 and a second diode D2. The first diode D1 has a first terminal (such as a cathode terminal) and a second terminal (such as an anode terminal). The first terminal of the first diode D1 is electrically connected to the first terminal 121 of the first winding coil 120. The second terminal of the first diode D1 is electrically connected to the first terminal of the first switch unit 220.

The second diode D2 has a first terminal (such as a cathode terminal) and a second terminal (such as an anode terminal). The first terminal of the second diode D2 is electrically connected to the second terminal of the first diode D1. The second terminal of the second diode D2 is electrically connected to the second terminal of the second switch unit 230.

In the overall operation of the control circuit component 140, in the first period, the control circuit 210 receives the input voltage VIN through the resistor R1, the control circuit 210 generates, for example, a control signal CS with a high logic level to the control terminal of the N-type transistor T1 (the first switch unit 220) and the control terminal of the P-type transistor T2 (the second switch unit 230), so that the N-type transistor T1 (the first switch unit 元 220) is turned on, and the P-type transistor T2 (the second switch unit 230) is not turned on. At this time, the second terminal 122 of the first winding coil 120 is electrically connected to the ground terminal GND through the N-type transistor T1 (the first switch unit 220), so that the input voltage VIN, the first winding coil 120 and the ground terminal GND may form a loop, and the control circuit 140 may drive the first winding coil 120 to operate.

In the second period, the control circuit 210 generates, for example, the control signal CS with a low logic level CS to the control terminal of the N-type transistor T1 (the first switch unit 220) and the control terminal of the P-type transistor T2 (the second switch unit 230), so that the N-type transistor T1 (the first switch unit 220) is not turned on, and the P-type transistor T2 (the second switch unit 230) is turned on. At this time, the second terminal 132 of the second winding coil 130 is electrically connected to the ground terminal GND through the P-type transistor T2 (the second switch unit 230), so that the input voltage VIN, the first winding coil 120, the second winding coil 130 and the ground terminal GND may form a loop, and the control circuit 140 may simultaneously drive the first winding coil 120 and the second winding coil 130 to operate. Therefore, the power consumption of the energy-saving electromagnetic brake 100 may be effectively reduced.

Figure 3A:
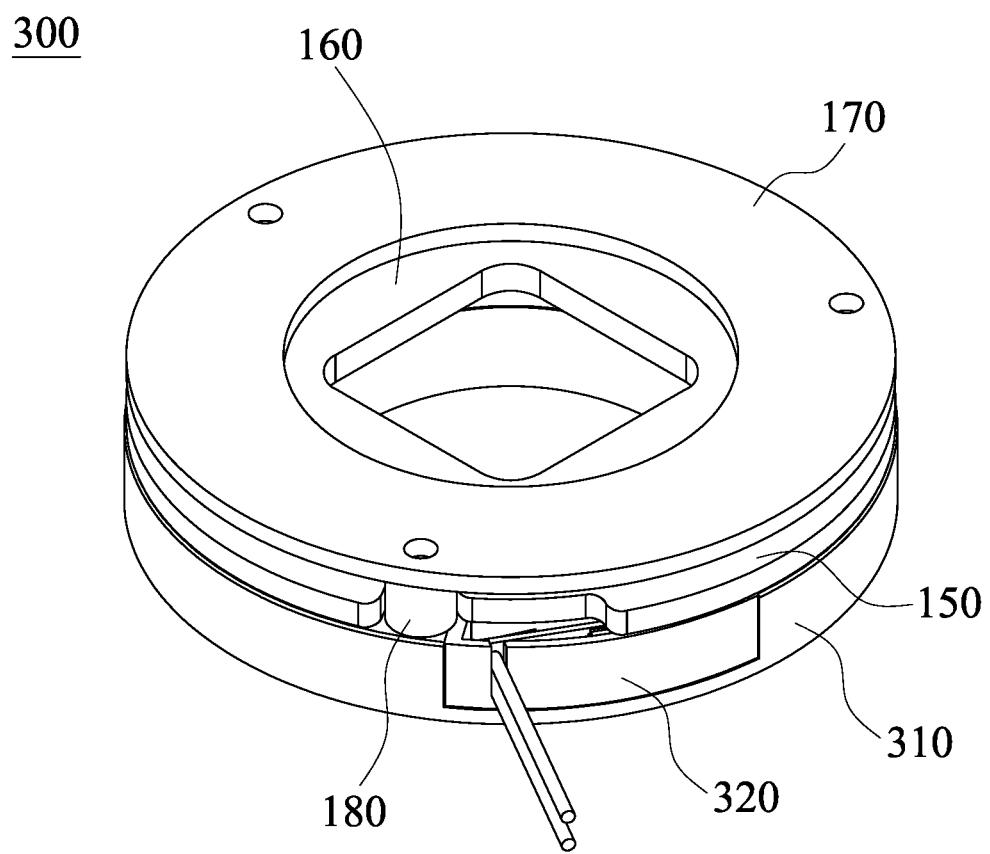
FIG. 3A is a perspective view of an energy-saving electromagnetic brake according an embodiment of the present invention.
Figure 3B:
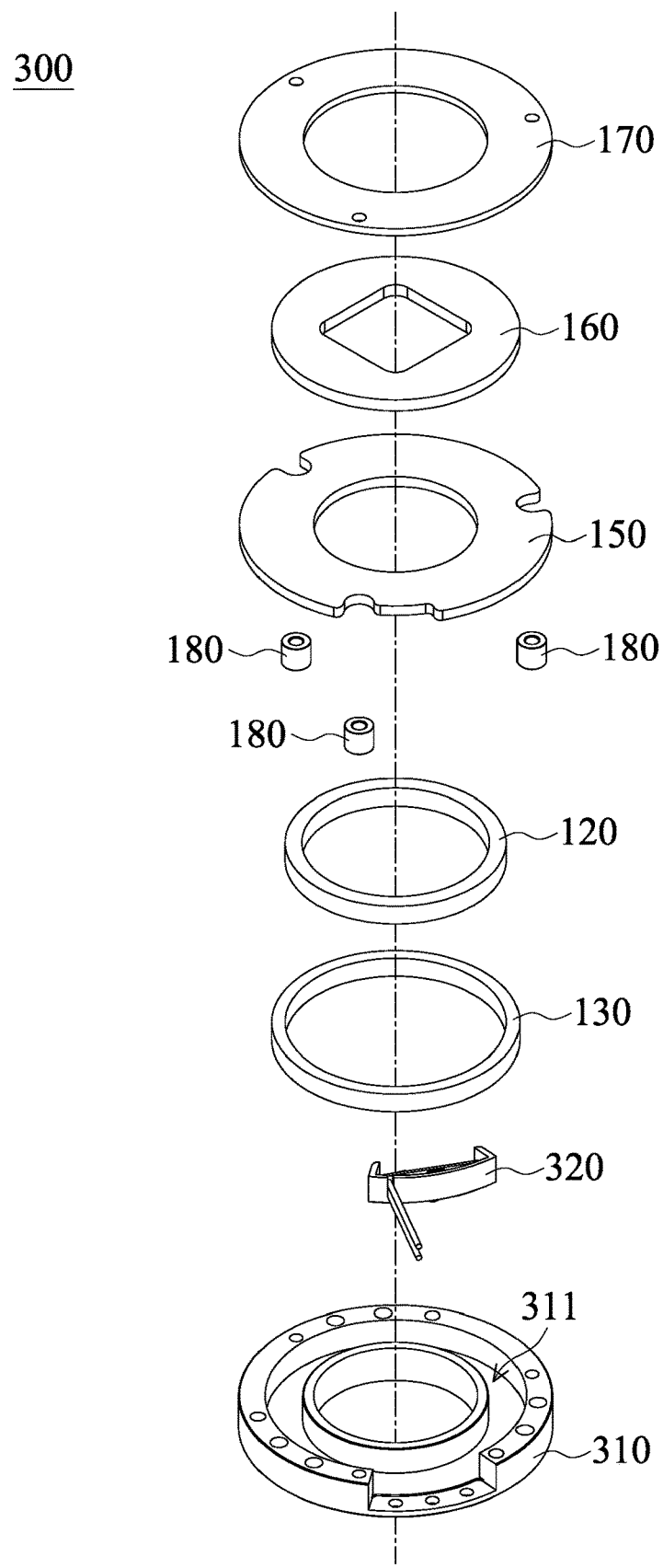
FIG. 3B is an exploded schematic diagram of an energy-saving electromagnetic brake according an embodiment of the present invention.

FIG. 3A is a perspective view of an energy-saving electromagnetic brake according an embodiment of the present invention. FIG. 3B is an exploded schematic diagram of an energy-saving electromagnetic brake according an embodiment of the present invention. Please refer to FIG. 3A and FIG. 3B. The energy-saving electromagnetic brake 300 may include a base 310, a first winding coil 120, a second winding coil 130, a control circuit component 320, a lower cover backplane 150, a brake pad 160, an upper cover backplane 170 and at least one fixing element 180.

In the embodiment, the first winding coil 120, the second winding coil 130, the lower cover backplane 150, the brake pad 160, the upper cover backplane 170 and the at least one fixing element 180 in FIG. 3A and FIG. 3B are the same as or similar to the first winding coil 120, the second winding coil 130, the lower cover backplane 150, the brake pad 160, the upper cover backplane 170 and the at least one fixing element 180 in FIG. 1A and FIG. 1B. Accordingly, the first winding coil 120, the second winding coil 130, the lower cover backplane 150, the brake pad 160, the upper cover backplane 170 and the at least one fixing element 180 in FIG. 3A and FIG. 3B may refer to the description of the embodiments of FIG. 1A and FIG. 1B, and the description thereof is not repeated herein.

In addition, in the embodiment, the shape and the structure of the base 310 and the control circuit 320 in FIG. 3A and FIG. 3B are slightly different from the shape and the structure of base 110 and the control circuit component 140 in FIG. 1A and FIG. 1B. Furthermore, the disposing position of the control circuit component 320 in FIG. 3A and FIG. 3B is also different from the disposing position of the control circuit component 140 in FIG. 1A and FIG. 1B. In the embodiment, the control circuit component 320 is disposed inside the accommodating space 311 of the base 310, and is disposed adjacent to the other side of the second winding coil 130 opposite to one side of the first winding coil 120. That is, the second winding coil 130 is located between the first winding coil 120 and the control circuit component 320. In addition, the energy-saving electromagnetic brake 300 may also achieve the same technical effect as the energy-saving electromagnetic brake 100.

Furthermore, the internal components of the control circuit components 320, the connection manner thereof and the operation manner thereof are the same as or similar to the control circuit component 140. The control circuit components 320 may refer to the description of the embodiment of FIG. 2, and the description thereof is not repeated herein.

Figure 4:
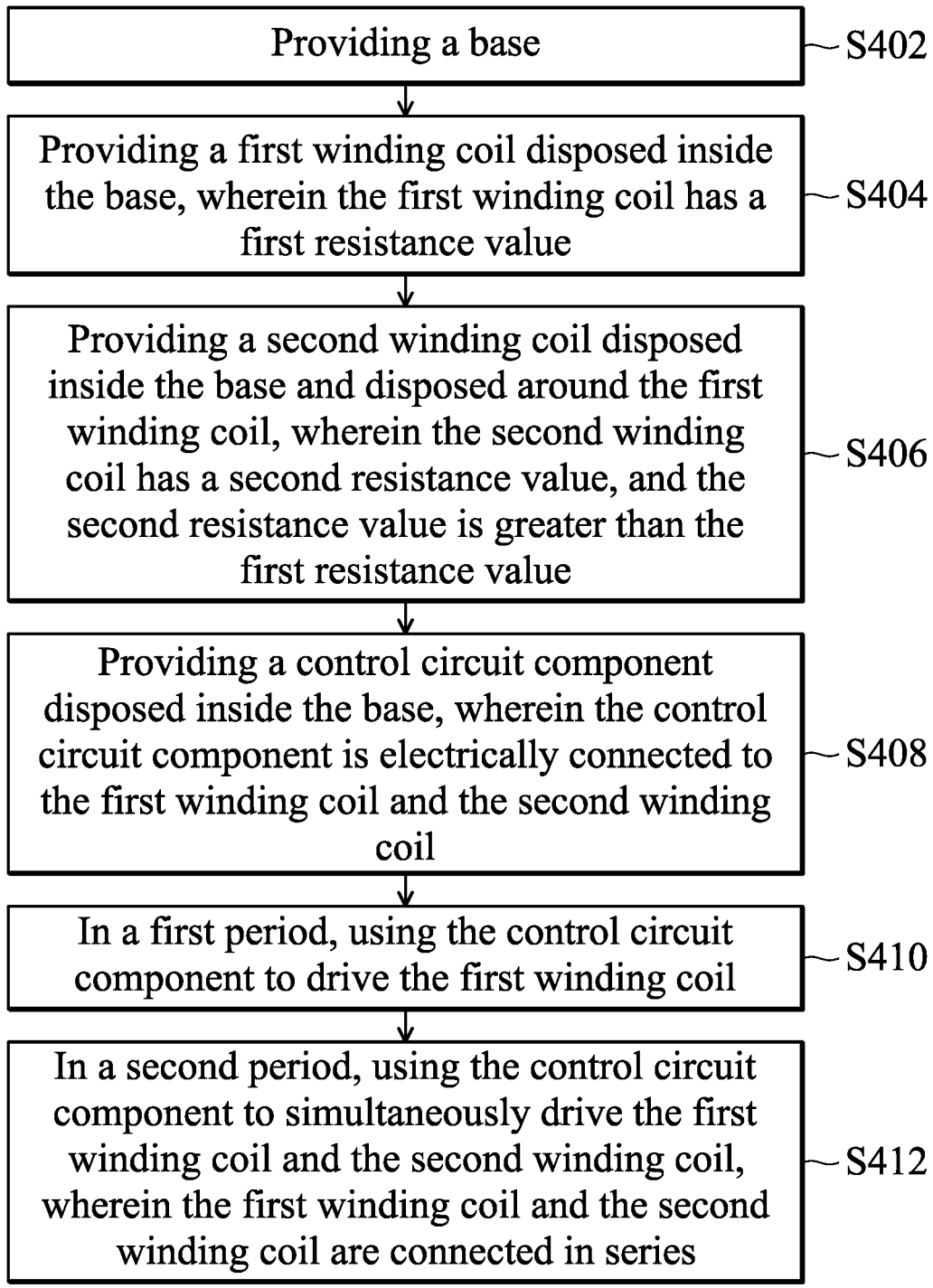
FIG. 4 is a flowchart of an operation method of an energy-saving electromagnetic brake according an embodiment of the present invention.

FIG. 4 is a flowchart of an operation method of an energy-saving electromagnetic brake according an embodiment of the present invention. In step S402, the method involves providing a base. In step S404, the method involves providing a first winding coil disposed inside the base, wherein the first winding coil has a first resistance value. In step S406, the method involves providing a second winding coil disposed inside the base and disposed around the first winding coil, wherein the second winding coil has a second resistance value, and the second resistance value is greater than the first resistance value.

In step S408, the method involves providing a control circuit component disposed inside the base, wherein the control circuit component is electrically connected to the first winding coil and the second winding coil. In step S410, the method involves in a first period, using the control circuit component to drive the first winding coil. In step S412, the method involves in a second period, using the control circuit component to simultaneously drive the first winding coil and the second winding coil, wherein the first winding coil and the second winding coil are connected in series.

Figure 5:
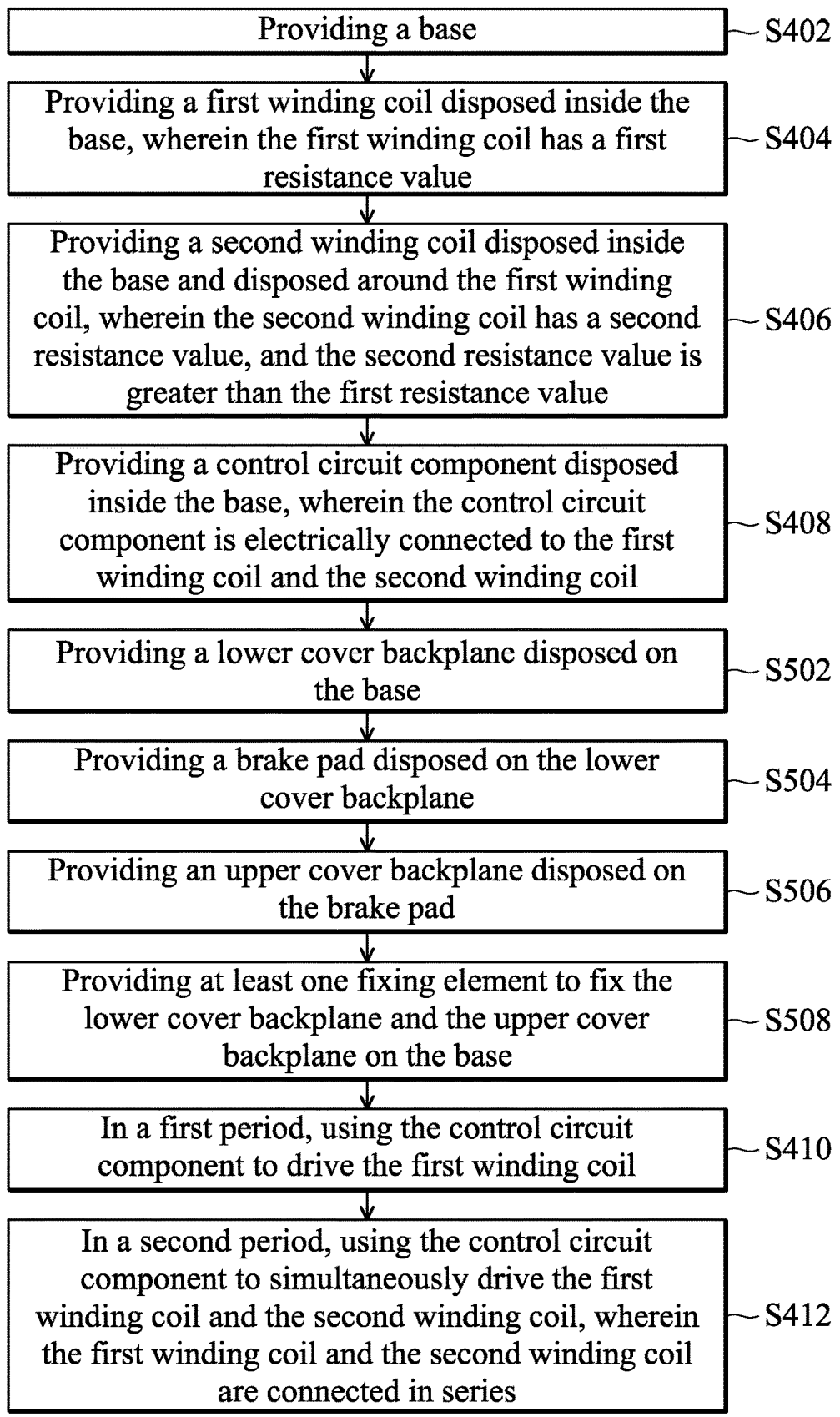
FIG. 5 is a flowchart of an operation method of an energy-saving electromagnetic brake according another embodiment of the present invention.

FIG. 5 is a flowchart of an operation method of an energy-saving electromagnetic brake according another embodiment of the present invention. In the embodiment, steps S402~S412 in FIG. 5 are the same as or similar to steps S402~S412 in FIG. 4. Accordingly, steps S402~S412 in FIG. 5 may refer to the description of the embodiment of FIG. 4, and the description thereof is not repeated herein. In step S502, the method involves. In step S502, the method involves providing a lower cover backplane disposed on the base. In step S504, the method involves providing a brake pad disposed on the lower cover backplane. In step S506, the method involves providing an upper cover backplane disposed on the brake pad. In step S508, the method involves providing at least one fixing element to fix the lower cover backplane and the upper cover backplane on the base.

Figure 6:
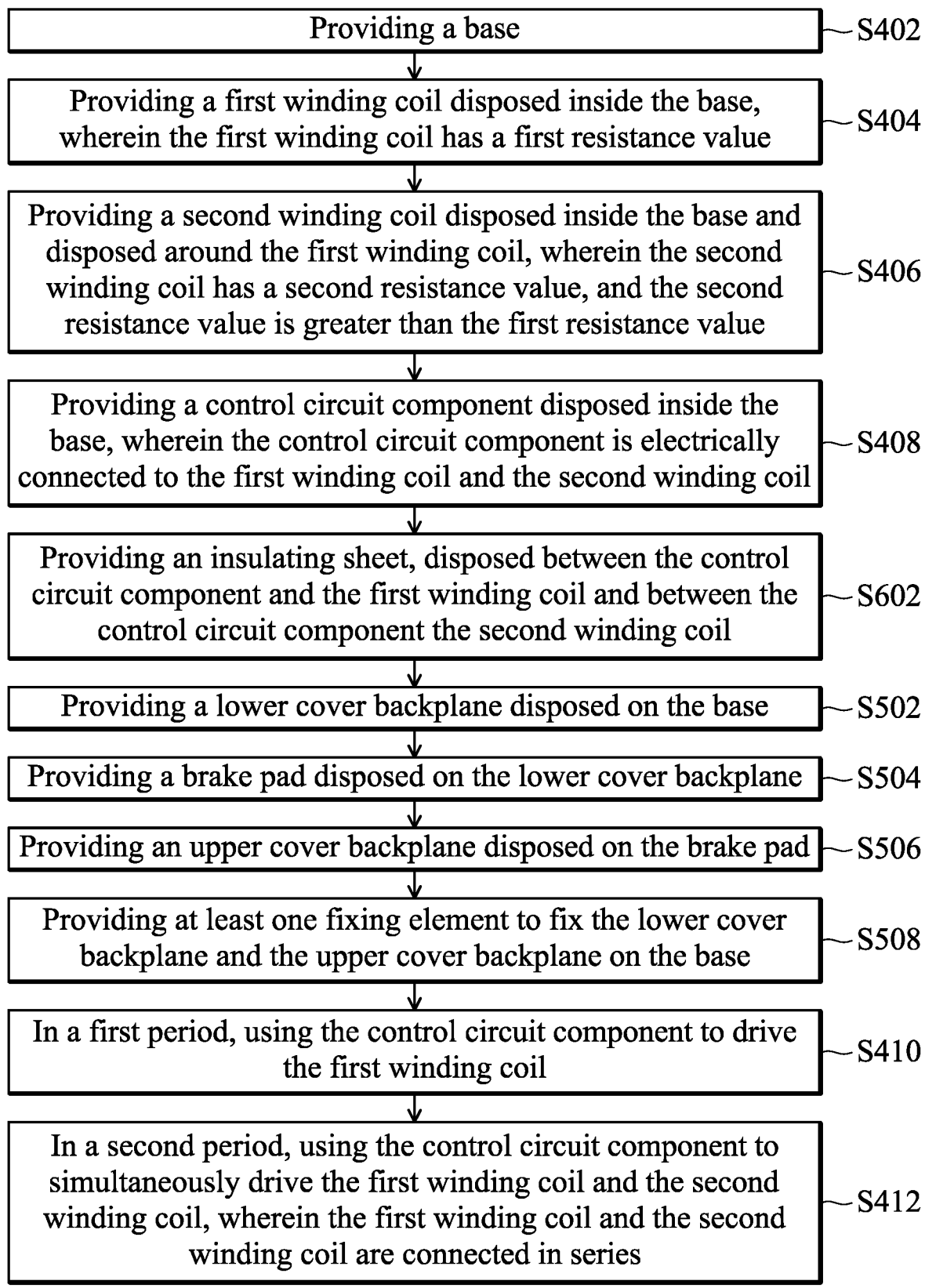
FIG. 6 is a flowchart of an operation method of an energy-saving electromagnetic brake according another embodiment of the present invention.

FIG. 6 is a flowchart of an operation method of an energy-saving electromagnetic brake according another embodiment of the present invention. In the embodiment, steps S402~S412 and S502~S508 in FIG. 6 are the same as or similar to steps S402~S412 and S502~S508 in FIG. 5. Accordingly, steps S402~S412 and S502~S508 in FIG. 6 may refer to the description of the embodiment of FIG. 5, and the description thereof is not repeated herein. In step S602, the method involves providing an insulating sheet, disposed between the control circuit component and the first winding coil and between the control circuit component the second winding coil.

It should be noted that the order of the steps of FIG. 4, FIG. 5 and FIG. 6 is only for illustrative purposes, and is not intended to limit the order of the steps of the present invention. The user may change the order of the steps above to meet specific requirements. The flowcharts described above may add additional steps or use fewer steps without departing from the spirit and scope of the present invention.

In summary, according to the energy-saving electromagnetic brake and the operation method thereof disclosed by the embodiment of the present invention, the first winding coil is disposed inside the base, and the first winding coil has the first resistance value. The second winding coil is disposed inside the base and disposed around the first winding coil, the second winding coil has the second resistance value, and the second resistance value is greater than the first resistance value. The control circuit component is disposed inside the base, and the control circuit component is electrically connected to the first winding coil and the second winding coil. In the first period, the control circuit component drives the first winding coil. In the second period, the control circuit component simultaneously drives the first winding coil and the second winding coil, and the first winding coil and the second winding coil are connected in series. Therefore, the power consumption and the volume of the energy-saving electromagnetic brake may be effectively reduced.

While the present invention has been described by way of example and in terms of the preferred embodiments, it should be understood that the present invention is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An energy-saving electromagnetic brake, comprising:
   a base;
   a first winding coil, disposed inside the base, wherein the first winding coil has a first resistance value;
   a second winding coil, disposed inside the base and disposed around the first winding coil, wherein the second winding coil has a second resistance value, and the second resistance value is greater than the first resistance value; and
   a control circuit component, disposed inside the base, wherein the control circuit component is electrically connected to the first winding coil and the second winding coil;
   wherein in a first period, the control circuit component drives the first winding coil, and in a second period, the control circuit component simultaneously drives the first winding coil and the second winding coil, and the first winding coil and the second winding coil are connected in series;
   wherein the control circuit component comprises:
   a resistor, having a first terminal and a second terminal, wherein the first terminal of the resistor receives an input voltage and is electrically connected to a first terminal of the first winding coil;
   a control circuit, electrically connected to the second terminal of the resistor;
   a first switch unit, having a first terminal, a second terminal and a control terminal, wherein the first terminal of the first switch unit is electrically connected to a second terminal of the first winding coil and a first terminal of the second winding coil, the second terminal of the first switch unit is electrically connected to a ground terminal, and the control terminal of the first switch unit is electrically connected to the control circuit; and
   a second switch unit, having a first terminal, a second terminal and a control terminal, wherein the first terminal of the second switch unit is electrically connected to the ground terminal, the second terminal of the second switch unit is electrically connected to a second terminal of the second winding coil, and the control terminal of the second switch unit is connected to the control circuit.

2. The energy-saving electromagnetic brake as claimed in claim 1, further comprising:
   a lower cover backplane, disposed on the base;
   a brake pad, disposed on the lower cover backplane;
   an upper cover backplane, disposed on the brake pad; and at least one fixing element, configured to fix the lower cover backplane and the upper cover backplane on the base.

3. The energy-saving electromagnetic brake as claimed in claim 2, further comprising:
an insulating sheet, disposed between the control circuit component and the first winding coil and between the control circuit component the second winding coil.

4. The energy-saving electromagnetic brake as claimed in claim 1, wherein the control circuit is a resistor-capacitor time delay circuit.

5. The energy-saving electromagnetic brake as claimed in claim 1, wherein an operation of the first switch unit is complementary to an operation of the second switch unit.

6. The energy-saving electromagnetic brake as claimed in claim 5, wherein the first switch unit is an N-type transistor, and the second switch unit is a P-type transistor.

7. The energy-saving electromagnetic brake as claimed in claim 1, wherein the control circuit component further comprises:
a first diode, having a first terminal and a second terminal, wherein the first terminal of the first diode is electrically connected to the first terminal of the first winding coil, and the second terminal of the first diode is electrically connected to the first terminal of the first switch unit; and
a second diode, having a first terminal and a second terminal, wherein the first terminal of the second diode is electrically connected to the second terminal of the first diode, and the second terminal of the second diode is electrically connected to the second terminal of the second switch unit.

8. An operation method of an energy-saving electromagnetic brake, comprising:
providing a base;
providing a first winding coil disposed inside the base, wherein the first winding coil has a first resistance value;
providing a second winding coil disposed inside the base and disposed around the first winding coil, wherein the second winding coil has a second resistance value, and the second resistance value is greater than the first resistance value;
providing a control circuit component disposed inside the base, wherein the control circuit component is electrically connected to the first winding coil and the second winding coil;
in a first period, using the control circuit component to drive the first winding coil; and
in a second period, using the control circuit component to simultaneously drive the first winding coil and the second winding coil, wherein the first winding coil and the second winding coil are connected in series;
wherein the control circuit component comprises:
a resistor, having a first terminal and a second terminal, wherein the first terminal of the resistor receives an input voltage and is electrically connected to a first terminal of the first winding coil;
a control circuit, electrically connected to the second terminal of the resistor;
a first switch unit, having a first terminal, a second terminal and a control terminal, wherein the first terminal of the first switch unit is electrically connected to a second terminal of the first winding coil and a first terminal of the second winding coil, the second terminal of the first switch unit is electrically connected to a ground terminal, and the control terminal of the first switch unit is electrically connected to the control circuit; and
a second switch unit, having a first terminal, a second terminal and a control terminal, wherein the first terminal of the second switch unit is electrically connected to the ground terminal, the second terminal of the second switch unit is electrically connected to a second terminal of the second winding coil, and the control terminal of the second switch unit is connected to the control circuit.

9. The operation method of the energy-saving electromagnetic brake as claimed in claim 8, further comprising:
providing a lower cover backplane disposed on the base;
providing a brake pad disposed on the lower cover backplane;
providing an upper cover backplane disposed on the brake pad; and
providing at least one fixing element to fix the lower cover backplane and the upper cover backplane on the base.

10. The operation method of the energy-saving electromagnetic brake as claimed in claim 9, further comprising:
providing an insulating sheet, disposed between the control circuit component and the first winding coil and between the control circuit component the second winding coil.

11. The operation method of the energy-saving electromagnetic brake as claimed in claim 8, wherein the control circuit is a resistor-capacitor time delay circuit.

12. The operation method of the energy-saving electromagnetic brake as claimed in claim 8, wherein an operation of the first switch unit is complementary to an operation of the second switch unit.

13. The operation method of the energy-saving electromagnetic brake as claimed in claim 12, wherein the first switch unit is an N-type transistor, and the second switch unit is a P-type transistor.

14. The operation method of the energy-saving electromagnetic brake as claimed in claim 8, wherein the control circuit component further comprises:
a first diode, having a first terminal and a second terminal, wherein the first terminal of the first diode is electrically connected to the first terminal of the first winding coil, and the second terminal of the first diode is electrically connected to the first terminal of the first switch unit; and
a second diode, having a first terminal and a second terminal, wherein the first terminal of the second diode is electrically connected to the second terminal of the first diode, and the second terminal of the second diode is electrically connected to the second terminal of the second switch unit.

* * * * *